(12) United States Patent
Van Lier

(10) Patent No.: US 8,760,305 B2
(45) Date of Patent: Jun. 24, 2014

(54) METHOD OF DETERMINING A REMAINING CAPACITY OF AN ENERGY SOURCE OF AN INFORMATION TAG FOR AGRICULTURE

(75) Inventor: Wilhelmus Johannes Adrianus Van Lier, Roosendaal (NL)

(73) Assignee: Lely Patent N.V., Maassluis (NL)

( * ) Notice: Subject to any disclaimer, the term of this patent is extended or adjusted under 35 U.S.C. 154(b) by 357 days.

(21) Appl. No.: 13/228,521

(22) Filed: Sep. 9, 2011

(65) Prior Publication Data
US 2011/0316709 A1 Dec. 29, 2011

Related U.S. Application Data

(63) Continuation of application No. PCT/NL2010/000037, filed on Mar. 10, 2010.

(30) Foreign Application Priority Data

Mar. 13, 2009 (NL) .................................... 1036710

(51) Int. Cl.
*G08B 21/00* (2006.01)

(52) U.S. Cl.
USPC ............... 340/636.1; 340/636.19; 340/572.1

(58) Field of Classification Search
USPC ....................................................... 340/636.1
See application file for complete search history.

(56) References Cited

U.S. PATENT DOCUMENTS

| 7,782,204 B2 * | 8/2010 | Sato ........................... 340/572.1 |
| 2006/0265181 A1 * | 11/2006 | Stewart ......................... 702/178 |
| 2008/0048866 A1 | 2/2008 | Hahn et al. |
| 2008/0079549 A1 | 4/2008 | Yamada et al. |

OTHER PUBLICATIONS

International Search Report issued on Apr. 16, 2010.

* cited by examiner

*Primary Examiner* — Kerri McNally
(74) *Attorney, Agent, or Firm* — Hoyng Monegier LLP; Minerva Rivero; David P. Owen

(57) ABSTRACT

The invention relates to a method of determining a remaining capacity of an energy source of an agricultural information tag. The method includes adjusting, such as increasing or decreasing, a counter at the occurrence of an event which leads to a consumption of energy from the energy source, and determining a remaining capacity of the energy source from a value of the counter. The event may include the elapsing of a predetermined period of time and a transmission of information by the information tag.

27 Claims, 1 Drawing Sheet

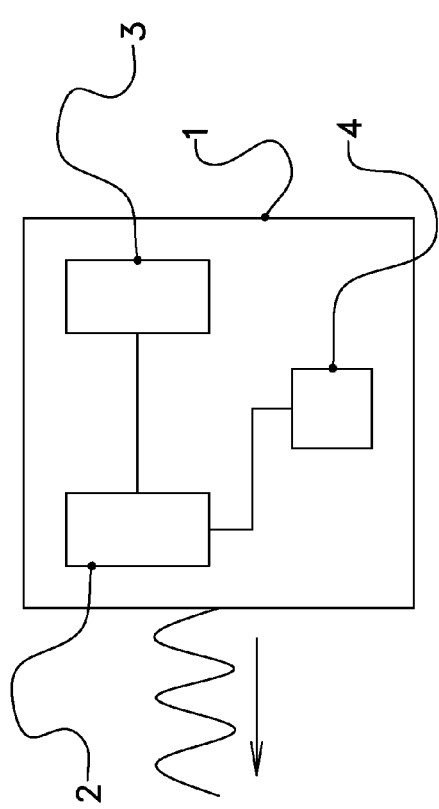
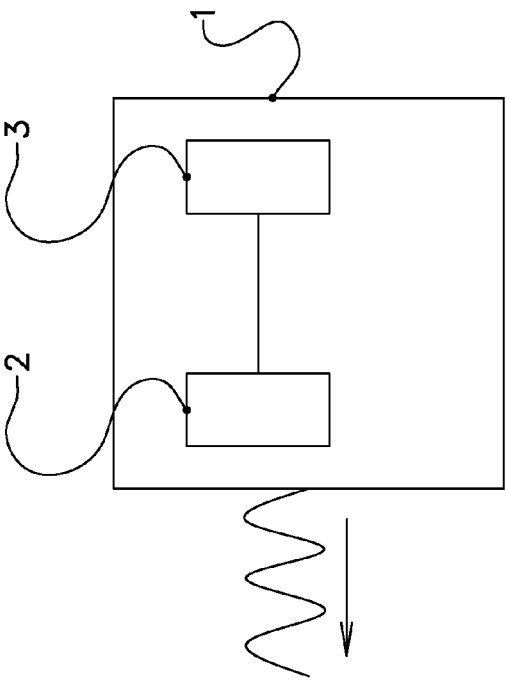
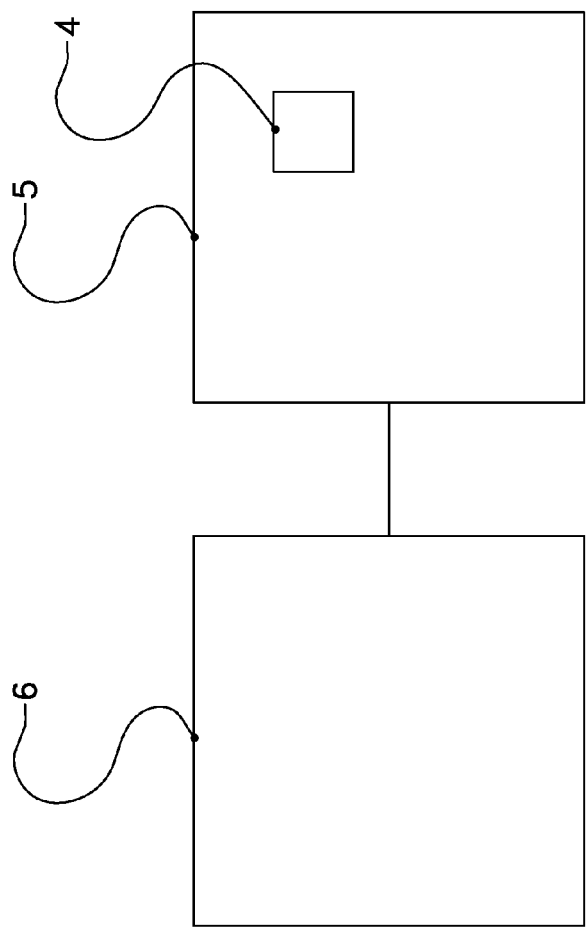
FIG. 1
FIG. 2

METHOD OF DETERMINING A REMAINING CAPACITY OF AN ENERGY SOURCE OF AN INFORMATION TAG FOR AGRICULTURE

CROSS REFERENCE TO RELATED APPLICATIONS

This application is a continuation of PCT application number PCT/NL2010/000037 filed on 10 Mar. 2010, which claims priority from Netherlands application number 1036710, filed on 13 Mar. 2009. The contents of both applications are hereby incorporated by reference in their entireties.

BACKGROUND OF THE INVENTION

1. Field of the Invention

The invention relates to a method of determining a remaining capacity of an energy source of an information tag for agriculture. The invention furthermore relates to an information system for agriculture, and to an information tag for agriculture.

2. Description of the Related Art

In agriculture (comprising arable and dairy farming) use is made of information tags, such as transponders, transmitters, and the like, which are able to transfer information in a wireless manner to a receiver. The information may comprise identification data for identifying an entity such as an animal, plant, seed bed or the like to which the tag in question is connected. It is also possible that the information comprises a plurality of other data, such as data in relation to the animal, the plant or the like to which the tag is connected.

In this document, by the term tag should be understood any information carrier which is adapted to a (preferably wireless) transmission of data to a receiver. The wireless information transmission can take place via radio waves, optically (such as infrared) or by means of any other suitable data transmission.

The information tag can be passive, i.e. that it is supplied with energy by receiving an energy transmitted by a transmitter (such as an electromagnetic field). However, information tags which comprise their own energy source (such as an optionally rechargeable battery, a capacitor or the like) are used to an increasing extent.

A problem which occurs when applying an information tag which is provided with an energy source, is that the energy source getting exhausted can result in failures. It is, for example, possible that owing to a too low energy level the information tag is no longer able to supply an information signal or a sufficiently strong information signal at the required moments or locations, so that the animal or plant in question can no longer be recognized in the correct manner, the required information can no longer be transmitted, and the like, which may result in undesirable or dangerous situations, such as not or not timely treating (for example milking, cleaning, feeding, watering, administering medicine etc. to) an entity which is connected to the tag, such as a plant, animal or otherwise.

BRIEF SUMMARY OF THE INVENTION

The present invention addresses these problems by enhancing a reliability of the functioning of the tag. According to an aspect of the invention, there is provided a method of determining a remaining capacity of an energy source of an agricultural information tag, comprising: adjusting a counter at the occurrence of an event which leads to a consumption of energy from the energy source, and determining a remaining capacity of the energy source from a value of the counter. By updating, by means of a counter, events which lead to a reduction of the energy in the energy source of the tag, it is possible to derive the total amount of energy consumed from the value of the counter, and therewith the remaining capacity of the energy source, so that a low energy level can be detected before this leads to a reduced operational reliability of the functioning of the tag.

The event may be the elapsing of a predetermined period of time, by means of which the reduction of the energy level can be determined over time. Each time when the predetermined period of time has elapsed, the counter can be adjusted accordingly, for example be increased, so that the (cumulative) value of the counter offers an indication of the total time the information tag is operative by means of the energy source in question.

The event may also comprise the transmission of information by the information tag. At each transmission of information, for example a data package, a certain amount of energy is consumed by a transmitter in the information tag, so that the total energy consumed by transmission can be determined from the (cumulative) value of the counter.

It is possible that both the elapsing of the predetermined period of time and the transmission of information lead to the increasing of the same counter. This makes it possible to carry out a simple and accurate determination of the total consumption, and therewith of the remaining energy supplies, in particular when the energy consumption at the transmission of information, and the energy consumption over the predetermined period of time, have a substantially equal or comparable value.

It is also possible for the counter to comprise a first counter for counting the elapsing of the time from a putting into operation of the energy source, and a second counter for counting the transmission of information by the information tag. The remaining capacity of the energy source is then determined from the values of the first and second counters. This makes it possible to take both the operating time and the transmission of information into account, also when the energy consumption values thereof whether or not strongly differ from each other.

In order to determine the remaining capacity in a simple and accurate manner, determining the remaining capacity may comprise: determining a total rest energy consumption from the value of the first counter and a rest energy consumption value over a period of time between successive adjustments of the first counter; determining a total transmission energy consumption from the value of the second counter and an energy consumption value per transmission by the information tag, determining a total energy consumption from the total rest energy consumption and the total transmission energy consumption, and determining the remaining capacity of the energy source from the total energy consumption and a total capacity of the energy source.

The method may further comprise: measuring a temperature of the energy source, and correcting the total rest energy consumption and/or the total capacity of the energy source, for the measured temperature. This makes it possible to carry out a correction of the total consumption, so that, for example, a temperature dependency on leakage currents, and/or the temperature dependency on the capacity of the energy source, can be taken into account.

The counter or counters can be accommodated in the information tag, by means of which a reliable counting, at for example each transmission of information, is possible. In that case, the data which represents the or at least one of the counter values can be transmitted by the tag at each transmission of information by the tag, so that, for example, a central management system is provided several times with information regarding the energy level of the tag.

In order to keep the tags as simple as possible, it is also possible to provide one or more of the counters in a receiver for receiving the information from the tag, or in a management system (for example implemented in software) which is connected to the receiver for processing the information which is received from the tag. In this case, the counter, the first counter, respectively, can be started at a first detection of the tag by the receiver, in which case the possibly provided second counter can be adjusted at each receipt of information from the tag.

In order to be able timely to recharge or replace the energy source of the tag, the method may further comprise: generating a warning, such as a warning message and/or signal for a user when a remaining capacity of the energy source downwardly exceeds a threshold.

The invention further comprises an agricultural information system comprising an agricultural information tag for transmitting information which relates to an entity, and a receiver for receiving the information, wherein the agricultural information tag comprises an energy source, and wherein the agricultural information system comprises a counter and is configured for: adjusting the counter at the occurrence of an event which leads to a consumption of energy from the energy source, and determining a remaining capacity of the energy source from a value of the counter.

The invention also comprises an agricultural information tag for transmitting information which relates to an agricultural entity, wherein the information tag comprises a transmitter and an energy source for feeding the transmitter, characterized in that the information tag comprises a counter and is configured for: adjusting the counter at an occurrence of an event which leads to a consumption of energy from the energy source, wherein the information tag is configured for transmitting data derived from a value of the counter.

With the agricultural information system and the agricultural information tag according to the invention, the same or similar effects and advantages can be achieved as with the method according to the invention. Identical or similar preferred embodiments, with which identical or comparable advantages can be achieved as with the corresponding preferred embodiments of the method according to the invention, are possible as well.

BRIEF DESCRIPTION OF THE DRAWINGS

The features and advantages of the invention will be appreciated upon reference to the following drawings, in which:

FIG. 1 shows schematically an embodiment of an agricultural information tag according to an aspect of the invention, and FIG. 2 shows schematically an embodiment of an agricultural information system according to an aspect of the invention.

DESCRIPTION OF ILLUSTRATIVE EMBODIMENTS

The following is a description of certain embodiments of the invention, given by way of example only and with reference to the drawings. Referring to FIG. 1, an information tag 1 is shown, which is provided with a transmitter 2 for transmitting information (for example an identification code of the tag) and a battery 3 which acts as an energy source for supplying electric energy to the transmitter 2. The information tag 1 is also provided with a counter 4. The transmitter 2 (for example a radio transmitter which transmits in a specific frequency band) can transmit information in the form of any desired codification or modulation, and then transmit analogous and/or digital data. The data may comprise any desired data, for example an identification code for identifying the agricultural entity (for example the animal or the plant) to which the tag 1 relates and/or to which the tag 1 is connected. The tag 1 can transmit the information in response to a poll by an external signal, or of its own accord, for example periodically. The (block)-schematically shown tag 1 further comprises the above-mentioned counter 4 for counting an event which leads to a consumption of energy from the battery 3. The occurrence of such an event can be detected in a variety of manners, of which a number of examples are described below. The transmitter 2 can, for example, supply a signal to the counter 4, by means of which such an event is signalled. This can be advantageous if the event comprises the transmission of information by means of the transmitter 2. At each activity of the transmitter 2 (which usually comprises transmitting during a fixed period of time, transmitting with a fixed power and/or transmitting a data package with a fixed size), a certain amount of energy from the battery 3 will be consumed. According to another example, it is possible for the counter 4, or electronics connected thereto, to establish autonomously an event such as the elapsing of a specific period of time, for example by means of a time measurement. It is also possible for the tag 1 to be provided with a control device, not shown in FIG. 1, such as a microcontroller, wherein the microcontroller supplies a signal to the counter 4 for adjusting the value thereof at the occurrence of an event. Adjusting the counter 4 can take place either by increasing the value of the counter 4 at the occurrence of an event or by decreasing the value of the counter 4 at the occurrence of an event. In the latter case, the counter 4 has a starting value which is indicative of a starting capacity of the energy source, the battery 3 in the embodiment shown. The counter 4 can be designed as a hardware counter which, for example, counts in a binary codification; however, it is also possible for the counter 4 to be provided in software which forms part of the software which is executed by the non-shown control device of the counter 4. The counter 4 can count a single value which, for example, comprises the elapsing of time and/or the transmission of information (for example by means of data packages); however, it is also possible to provide two or more counters in the tag 1, in which case different events (which, for example, each result in a different energy consumption) are updated in separate counters. It is possible to determine a total consumption of energy from the battery 3 from a value, in other words from a position of the counter or counters 4. Such a determination can be carried out by the tag 1 itself, for example if the latter is provided with the above-mentioned control device; however, it is also possible for the tag 1 to transmit a value of the counter or counters 4, or a quantity derived therefrom, by means of the transmitter 2, for example at each transmission of information by the transmitter 2 of the tag 1. In addition to the described counting by a counter 4, it is possible to carry out a measurement of an electric quantity, for example a voltage which is supplied by the energy source 3, in order to obtain therewith additional information regarding the remaining energy of the energy source 3.

FIG. 2 shows an alternative embodiment of the tag 1, which is also provided with a transmitter 2 and an energy source 3. In contrast with the embodiment which is schematically shown in FIG. 1, in the embodiment according to FIG. 2, the counter 4 is provided in or connected to a receiver 5 which is configured to receive the signal containing the information transmitted by the tag 1. For this purpose, a counting can take place in the receiver 5 or in a data processing device 6 connected to the receiver 5, such as a computer which is loaded with a program for, for example, managing the information transmitted by the tag 1. The counter or counters 4 in the receiver 5 or the data processing device 6 can be increased at the occurrence of an event such as the receipt of a signal of the tag 1 by the receiver 5, or the elapsing of a specific period of time, so that therewith a consumption of energy by transmitting information, by consumption or leakage losses over time, respectively, can be determined. An advantage of the configuration shown in FIG. 2 is that no counter or counters 4 need be present in the tags 1. In addition to updating a counter 4, it is also possible to measure a temperature in the tag 1, or alternatively in the receiver 5, in order to be able, when determining the remaining energy of the accumulator 3, also to take temperature effects in capacity, leakage and/or consumption into account.

Thus, the invention has been described by reference to certain embodiments discussed above. It will be recognized that these embodiments are susceptible to various modifications and alternative forms well known to those of skill in the art. For example, the event may be modified by environmental, temporal or based on actions undertaken by the information tag and/or the like.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A method of determining a remaining capacity of an energy source of an information tag, comprising:
   adjusting a counter at an occurrence of an event which leads to a consumption of energy from the energy source, and
   determining a remaining capacity of the energy source from a value of the counter; wherein the counter comprises: a first counter for counting the elapsing of a time from a putting into operation of the energy source and determining a value, and
   a second counter for counting the transmission of information by the information tag and determining a second value, and
   wherein the remaining capacity of the energy source is determined from the values of the first and second counters; and
   wherein the determining of the remaining capacity comprises:
   determining a total rest energy consumption from the value of the first counter and a rest energy consumption value over a period of time between successive adjustments of the first counter;
   determining a total transmission energy consumption from the value of the second counter and an energy consumption value per transmission by the information tag, determining a total energy consumption from the total rest energy consumption and the total transmission energy consumption, and
   determining the remaining capacity of the energy source from the total energy consumption and a total capacity of the energy source.

2. The method according to claim 1, wherein the event comprises an elapsing of a predetermined period of time.

3. The method according to claim 1, wherein the event comprises a transmission of information by the information tag.

4. The method according to claim 1, further comprising:
   measuring a temperature of the energy source, and
   correcting at least one of the total rest energy consumption and the total capacity of the energy source, for the measured temperature.

5. The method according to claim 1, wherein the counter is provided in the information tag.

6. The method according to claim 5, wherein data which represent the value of the counter are transmitted by the tag at each transmission of information by the tag.

7. The method according to claim 1, wherein the counter is provided in a receiver for receiving the information from the information tag, or in a management system connected to a receiver for processing the information received from the information tag.

8. The method according to claim 7, wherein the first counter is started at a first detection of the information tag by the receiver, and the second counter is adjusted at each receipt of information from the information tag.

9. The method according to claim 1, further comprising:
   generating a warning for a user when a remaining capacity of the energy source downwardly exceeds a threshold.

10. The method according to claim 1, wherein adjusting the counter at the occurrence of an event is increasing the counter.

11. The method according to claim 1, wherein adjusting the counter at the occurrence of an event is decreasing the counter.

12. An information system comprising an information tag for transmitting information, and a receiver for receiving the transmitted information, wherein the information tag comprises an energy source, and wherein the information system comprises a counter and is configured for:
   adjusting the counter at the occurrence of an event which leads to a consumption of energy from the energy source, and
   determining a remaining capacity of the energy source from a value of the counter; wherein the counter comprises:
   a first counter for counting an elapsing of the time from a putting into operation of the energy source, and
   a second counter for counting a transmission of information by the information tag, and
   wherein the remaining capacity of the energy source is determined from the values of the first and second counters; and wherein the determining of the remaining capacity comprises:
   determining a total rest energy consumption from the value of the first counter and a rest energy consumption value over a period of time between successive adjustments of the first counter;
   determining a total transmission energy consumption from the value of the second counter and an energy consumption value per transmission by the information tag;
   determining a total energy consumption from the total rest energy consumption and the total transmission energy consumption; and
   determining the remaining capacity of the energy source from the total energy consumption and a total capacity of the energy source.

13. The information system according to claim 12, configured for adjusting the counter at an elapsing of a predetermined period of time.

14. The information system according to claim 12, configured for adjusting the counter at a transmission of information by the information tag.

15. The information system according to claim 12, wherein the counter is provided in the information tag.

16. The information system according to claim 12, wherein the counter is provided in a receiver for receiving the information from the information tag, or in a management system connected to the receiver for processing the information received from the information tag.

17. The information system according to claim 16, wherein the information system is configured for starting the first counter at a first detection of the information tag by the receiver, and adjusting the second counter at each receipt of information from the information tag.

18. The information system according to claim 12, wherein the information system is configured for increasing the counter at the occurrence of an event which leads to a consumption of energy from the energy source.

19. The information system according to claim 12, wherein the information system is configured for decreasing the counter at the occurrence of an event which leads to a consumption of energy from the energy source.

20. An information tag for the transmission of information, wherein the information tag comprises a transmitter and an energy source for feeding the transmitter, wherein the information tag comprises a counter and is configured for:
   adjusting the counter at an occurrence of an event which leads to a consumption of energy from the energy source,
   wherein the information tag is configured for transmitting data derived from a value of the counter; wherein the counter comprises:
   a first counter for counting an elapsing of the time from a putting into operation of the energy source, and
   a second counter for counting a transmission of information by the information tag, and
   wherein the remaining capacity of the energy source is determined from the values of the first and second counters; and wherein the determining of the remaining capacity comprises:
   determining a total rest energy consumption from the value of the first counter and a rest energy consumption value over a period of time between successive adjustments of the first counter;
   determining a total transmission energy consumption from the value of the second counter and an energy consumption value per transmission by the information tag;
   determining a total energy consumption from the total rest energy consumption and the total transmission energy consumption; and
   determining the remaining capacity of the energy source from the total energy consumption and a total capacity of the energy source.

21. The information tag according to claim 20, wherein the data comprises a counter value of the first and second counters.

22. The information tag according to claim 21, wherein the tag is configured for determining the remaining capacity of the energy source from the value of the first and second counter respectively, and wherein the transmitted data comprises a determined capacity of the energy source.

23. The information tag according to claim 22, further comprising a temperature sensor for supplying a temperature signal, wherein the determined capacity of the energy source takes the temperature signal into account.

24. The information tag according to claim 20, configured for transmitting the data at each transmission of tag information.

25. The information tag according to claim 20, wherein the information tag is configured for increasing the counter at the occurrence of an event which leads to a consumption of energy from the energy source.

26. The information tag according to claim 20, wherein the information tag is configured for decreasing the counter at the occurrence of an event which leads to a consumption of energy from the energy source.

27. The information tag according to claim 20, wherein the tag is configured for determining the remaining capacity of the energy source from the value of the counter, and wherein the transmitted data comprises a determined capacity of the energy source.

* * * * *